(12) United States Patent
Henning et al.

(10) Patent No.: US 7,567,550 B2
(45) Date of Patent: Jul. 28, 2009

(54) BROADBAND COMMUNICATIONS

(75) Inventors: Ian D Henning, Ipswich (GB); David Wake, Ipswich (GB); Russell Davey, Ipswich (GB)

(73) Assignee: British Telecommunications plc, London (GB)

( * ) Notice: Subject to any disclaimer, the term of this patent is extended or adjusted under 35 U.S.C. 154(b) by 504 days.

(21) Appl. No.: 10/571,064

(22) PCT Filed: Sep. 22, 2004

(86) PCT No.: PCT/GB2004/004030

§ 371 (c)(1),
(2), (4) Date: Mar. 8, 2006

(87) PCT Pub. No.: WO2005/029907

PCT Pub. Date: Mar. 31, 2005

(65) Prior Publication Data

US 2007/0071189 A1    Mar. 29, 2007

(30) Foreign Application Priority Data

Sep. 23, 2003  (GB)  ................. 0322269.2
Sep. 2, 2004   (GB)  ................. 0419495.7

(51) Int. Cl.
*H04L 12/66* (2006.01)

(52) U.S. Cl. ............... 370/352; 370/503; 370/480; 370/260; 370/486

(58) Field of Classification Search ........... 370/352, 370/503, 480; 379/93.06; 375/260
See application file for complete search history.

(56) References Cited

U.S. PATENT DOCUMENTS

| 5,534,912 A | 7/1996 | Kostreski | |
| 6,148,006 A * | 11/2000 | Dyke et al. | 370/480 |
| 2002/0031113 A1* | 3/2002 | Dodds et al. | 370/352 |
| 2002/0135844 A1* | 9/2002 | Silberman et al. | 359/167 |
| 2007/0165688 A1 | 7/2007 | Lee et al. | |

FOREIGN PATENT DOCUMENTS

| EP | 0917392 A2 | 5/1999 |
| EP | 0917392 A3 | 5/1999 |
| JP | 2003224678 | 1/2002 |
| JP | 2003-209622 | 7/2003 |
| JP | 2003-224678 | 8/2003 |
| WO | WO 98/04057 | 1/1998 |

(Continued)

OTHER PUBLICATIONS

Bian et al, High-Power Operation of Electroabsorption modulators, Published Oct. 27, 2003 (received date Apr. 11, 2003), Applied Physics Letters, vol. 83, No. 17.*

(Continued)

*Primary Examiner*—Curtis Kuntz
*Assistant Examiner*—Phung-Hoang J Nguyen
(74) *Attorney, Agent, or Firm*—Nixon & Vanderhye PC (57) ABSTRACT

A communications network has a communications station, such as a telephone exchange, and at least one interface, such as a cabinet. A plurality of optical carriers are provided between the exchange and a cabinet, thereby allowing modulation of the signals, for example xDSL modulation, to be carried out at the exchange, rather than at the cabinet. This arrangement reduces the need to power the cabinet.

14 Claims, 5 Drawing Sheets

FOREIGN PATENT DOCUMENTS

WO        WO 02/45383 A2      6/2002

OTHER PUBLICATIONS

Shin et al., "Hybrid WDM/TDM-PON for 128 Subscribers Using λ-selection-free Transmitters", 2004 Optical Society of America.

Kim, "A Low-Cost WDM Source with an ASE Injected Fabry-Perot Semiconductor Laser", IEEE Photonics Technology Letters, vol. 12, No. 8, Aug. 2000.

UK Search Report dated Nov. 28, 2003.

International Search Report dated Feb. 2, 2005.

* cited by examiner

BROADBAND COMMUNICATIONS

This application is the US national phase of international application PCT/GB2004/004030 filed 22 Sep. 2004 which designated the U.S. and claims benefit of GB 0322269.2 and GB 0419495.7, dated 23 Sep. 2003 and 2 Sep. 2004, respectively, the entire content of which is hereby incorporated by reference.

BACKGROUND

1. Technical Field

The present invention relates to a communications network, in particular to a communications network having a communications station for example a telephone exchange, and at least one interface, for example a cabinet.

2Related Art

In recent years, particularly with increasing use of the internet, there has been an upsurge of interest in providing higher data rates to users. One objective of development in this area, in countries with a heavy historical investment on copper access networks, has been to make use of existing twisted-pair telephone lines. One result of this has been the Asymmetrical Digital Subscriber Line (ADSL) approach in which it was found that an existing copper pair from a telephone exchange to a telephone subscriber's premises could, using suitable modulation techniques, support significant downstream data rates, of the order of 1.5 Mbit/s. However the actual rate obtained in practice depends on the quality and length of the path from the exchange and an alternative proposal, providing higher data rates is to make use of the copper pair only from some point rather closer to the user. This is sometimes referred to as very high speed Digital Subscriber Line (VDSL), and these technologies tend to be referred to generically as "xDSL".

Figure 1:
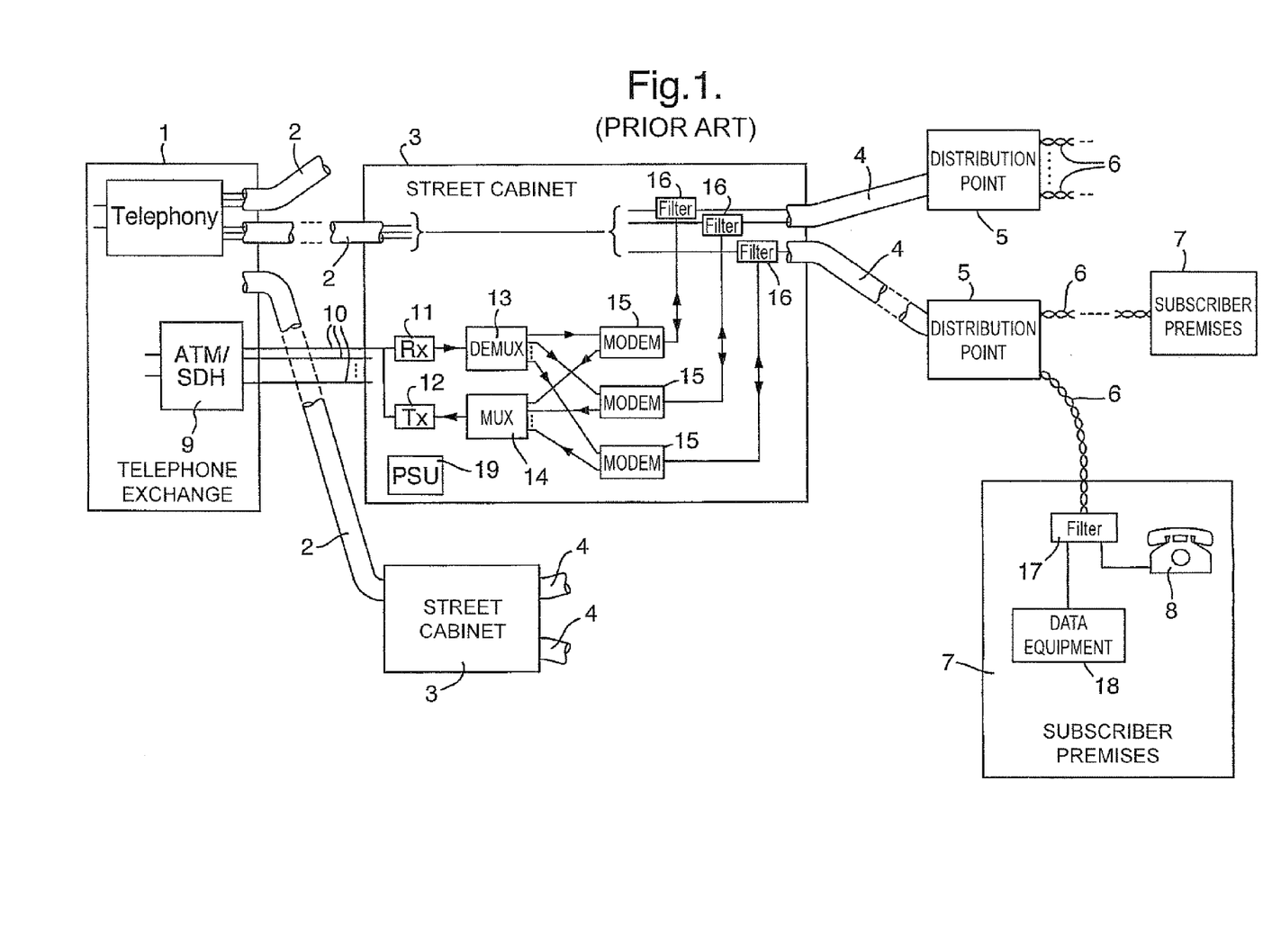
FIG. 1 is an example of part of a prior art network.

FIG. 1 illustrates such an "fibre to the cabinet" arrangement. A telephone exchange 1 provides telephony service via cables 2 (perhaps containing 1000 twisted copper pairs) to street cabinets (or cross-connect points) 3, from which rather smaller twisted-pair cables 4 feed distribution points 5. Individual twisted pairs 6 feed from the distribution point to subscriber's premises 7 to feed telephone equipment 8. Broadband service is provided from the exchange 1 by a multiplexer/demultiplexer 9 which multiplexes signals, using ATM or SDH techniques, onto one or more optical fibres 10, feeding the cabinet 3, and similarly demultiplexes signals travelling in the opposite direction. Within the cabinet 3 is (for each fibre) an optical receiver 11 and transmitter 12, demultiplexer 13, multiplexer 14 and xDSL modems 15 which are then connected via filters 16 to the copper pairs of the cable 4 leading to the distribution point 5 and thence via the pairs 6 to the subscriber premises 7 where a filter 17 separates (in the case of downstream signals) and combines (for upstream traffic) conventional telephony signals on the one hand and xDSL signals for data equipment 18 on the other. A power supply 19 is also provided in the cabinet to supply power to the receivers 11, transmitters 12, demultiplexers 13, multiplexers 14 and modems 15.

BRIEF SUMMARY

According to one aspect of the present invention there is provided a telecommunications network comprising:

a telephone exchange (or a communications station);

electrical transmission lines connecting the exchange (or the communications station) to user terminations;

data transmission means;

optical carriers connecting the data transmission means to at least one interface, located between the exchange (or the communications station) and user terminations, for converting optical signals from an optical carrier into electrical signals for transmission over at least one of the electrical transmission lines;

wherein, for each of a plurality of user terminations requiring data service:

(a) a dedicated one of said optical carriers is provided;

(b) the data transmission means comprises modulation means for converting input data signals into output signals suitable for transmission over the electrical transmission lines, followed by means for modulating the output signals onto an optical signal;

(c) the interface has optoelectrical conversion means arranged to recover said output signals and feed them to the electrical transmission line serving the relevant user termination.

Other aspects of the present invention are provided in the appended claims.

At least some of the user terminations may include respect connection points connecting a user termination to a plurality of further end points, the "user" for example being a network operator. The communication network, in particular the communications station may include a provision for a telephony service, including an exchange.

The optical carriers may be carrier waves, different carrier waves having different frequencies, so as to form respective wavelength channels. In order to carry data, each optical carrier can then be modulated with the data to be carried over that carrier. In this situation, at least some of the carrier waves will preferably be transmitted over a common transmission medium, such as a common optical fibre, in a wavelength division multiplexed manner. Wavelength division multiplexing means such as a wavelength-dependent coupler means will preferably be provided at the exchange, to allow different wavelength channels to be combined over a common optical medium.

Alternatively, the optical carriers may each be formed by a respective optical transmission line, such as an optical fibre. The optical fibres may be grouped so as to form an optical fibre cable.

BRIEF DESCRIPTION OF THE DRAWINGS

Some embodiments of the invention will now be described, by way of example, with reference to the accompanying drawings, in which.

DETAILED DESCRIPTION OF EXEMPLARY EMBODIMENTS

Figure 2:
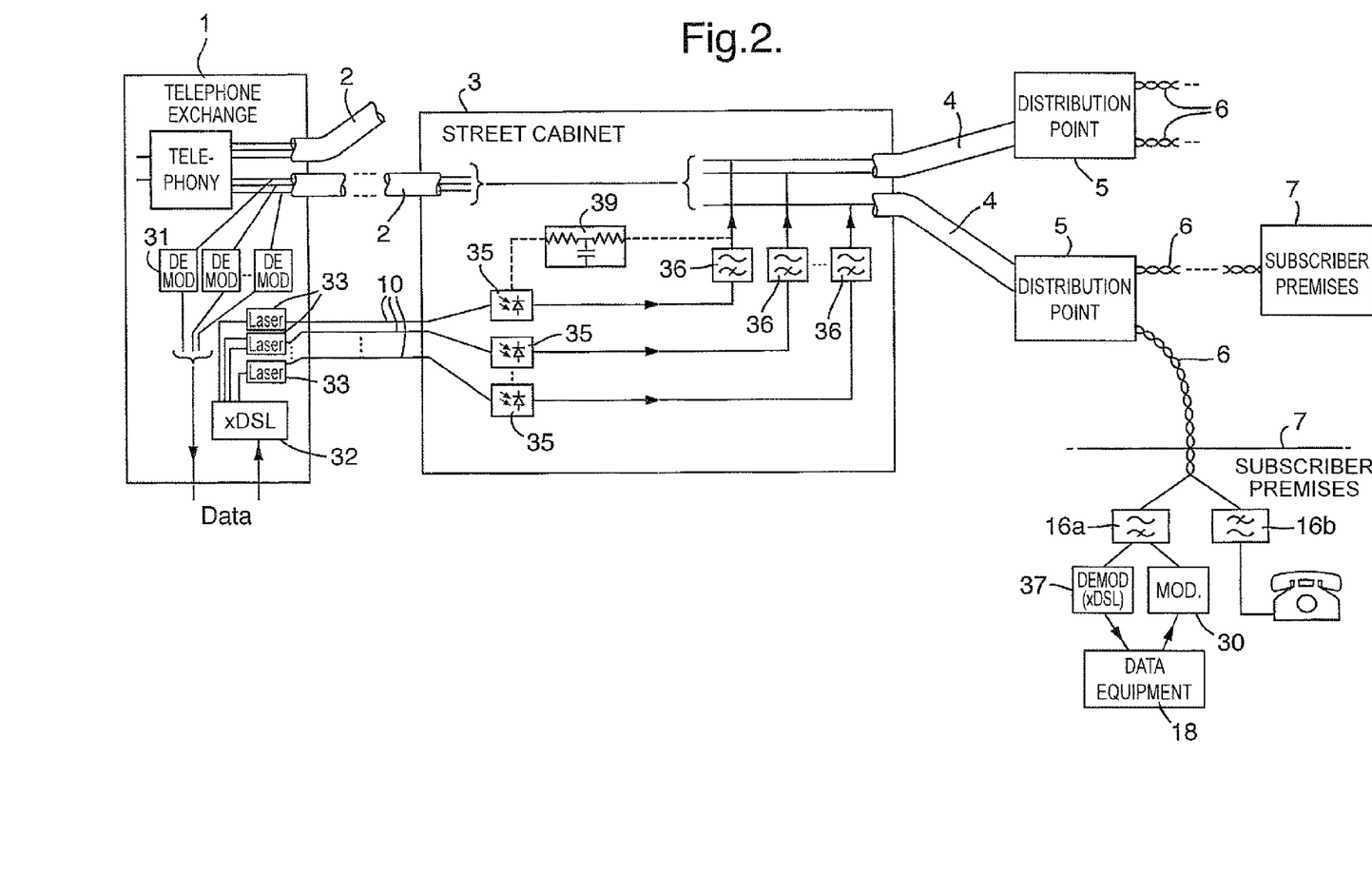
FIG. 2 show schematically part of a network according to the present invention.

FIG. 2 shows part of a telecommunications system in accordance with a first version of the invention, which is similar to that shown in FIG. 1 in that it utilizes optical fibre from the exchange to the cabinet, while from the cabinet to the subscriber premises, it shares the twisted-pair lines with conventional telephony. In this arrangement, however, the aim is to reduce the amount of electronics installed in the cabinet. In this particular version, the optical fibre is used only for downstream transmission; upstream data transmission (if required) is provided using the copper pairs from the subscriber premises to the exchange, using the same techniques as in a conventional ADSL system, via modulators 30 in the subscriber's data equipment and demodulators 31 in the exchange 1. No multiplexing is employed on the optical fibres 10, so one fibre 10 is provided for each of the subscriber lines 6 that is to be provided with broadband service. No demultiplexers are employed in the cabinets 3. Moreover, appropriate modulation for converting digital data into a form suitable for downstream transmission on the twisted pairs 4, 6 is provided by xDSL modulators 32 in the exchange 1. These modulators are conventional and operated in the same manner as the modulator parts of the modems 15 of FIG. 1, using any technique suited to the purpose, for example, discrete multitone (DMT) modulation, or carrierless amplitude/phase (CAP) modulation. The modulated output of each modulator then modulates a laser 33.

In the cabinet 3, it is merely necessary to convert the modulated optical signal received over the fibre 10 into electrical form, and apply this signal via a suitable high-pass filter 36 to the appropriate pair within one of the cables 4. In this, the simplest implementation of the invention, this conversion is performed by zero-bias PIN photodiodes 35, and then supplied to the cables 4 via high-pass filters 36. No power supply to the cabinet is required. Since the frequencies would below (less than 1 GHz), a large area diode could be used, allowing simple low cost alignment and high power operation (typically 0 to +10 dBm).

At the subscriber premises, the downstream signals are received from the splitter/combiner 16 (shown as separate high-pass and low-pass filters 16a, 16b) by an xDSL demodulator 37.

Note that it is not necessary that the interface between the fibres 10 and the copper cabling should occur in the cabinet 3, as it could equally well occur at the distribution point 5 or indeed other intermediate location between the exchange and the subscriber's premises.

Figure 3:
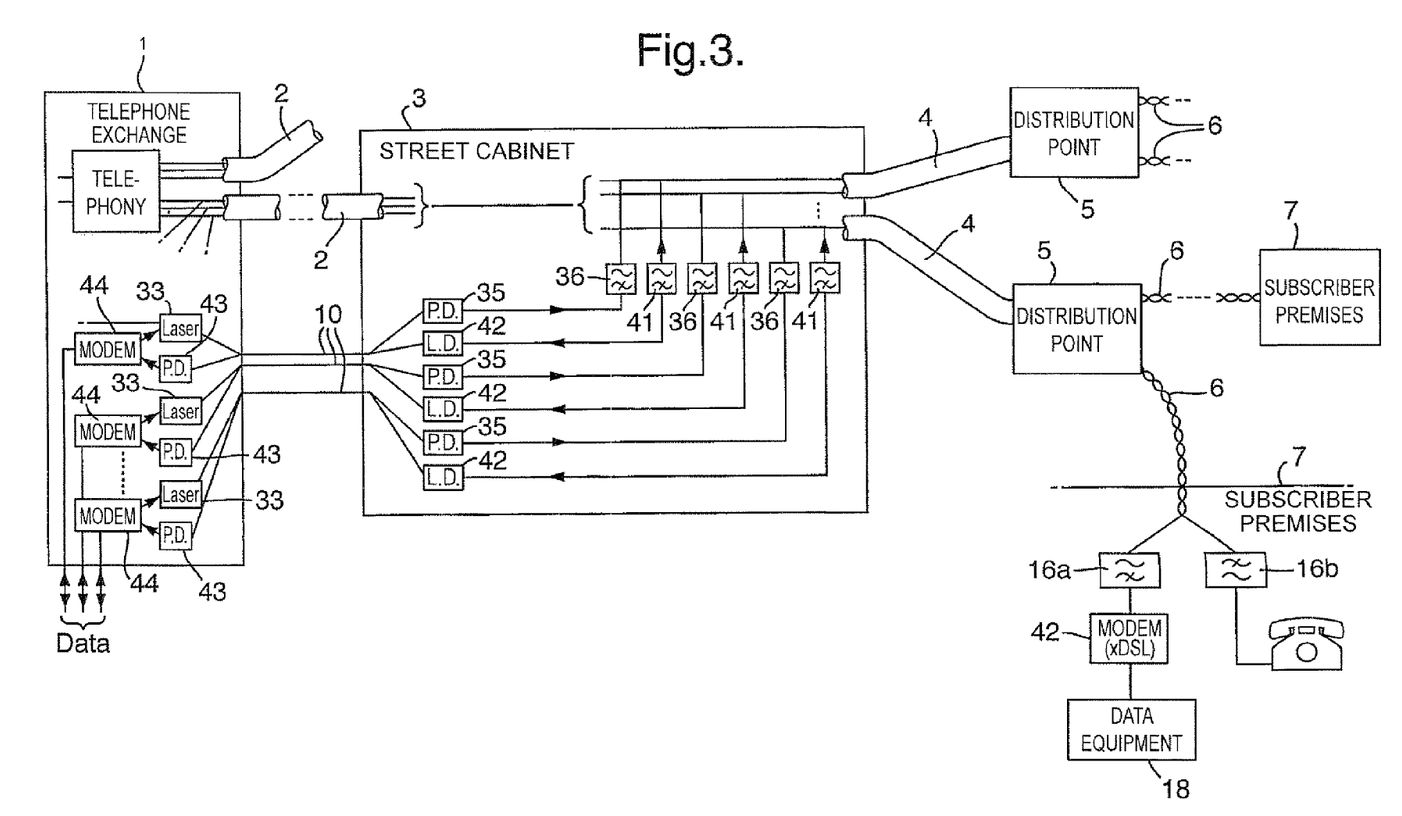
FIG. 3 shows a further embodiment of a network according to the present invention.

If one prefers not to provide an upstream data path using copper all the way back to the exchange as envisaged in FIG. 2, then one could use the fibres bidirectionally, as illustrated in FIG. 3. Here the downstream arrangements are as described with reference to FIG. 2, but the subscriber has an xDSL modem 42 which is entirely conventional. In the cabinet 3, the upstream signals from the line 4 are fed via a high-pass filter 41 to a laser diode 42 to generate an optical signal which is received by a photodiode 43 at the exchange 1 and supplied to an xDSL modem 44. The high-pass filters 36, 41 are tuned to the respective parts of the frequency spectrum corresponding to downstream and upstream signals, respectively. Note that, in fact, it is not essential that the equipment 33, 43, 44 be sited at the exchange 1, as they could, if desired, be at some other exchange, or any other location to which the fibres 10 can conveniently be connected.

Figure 4:
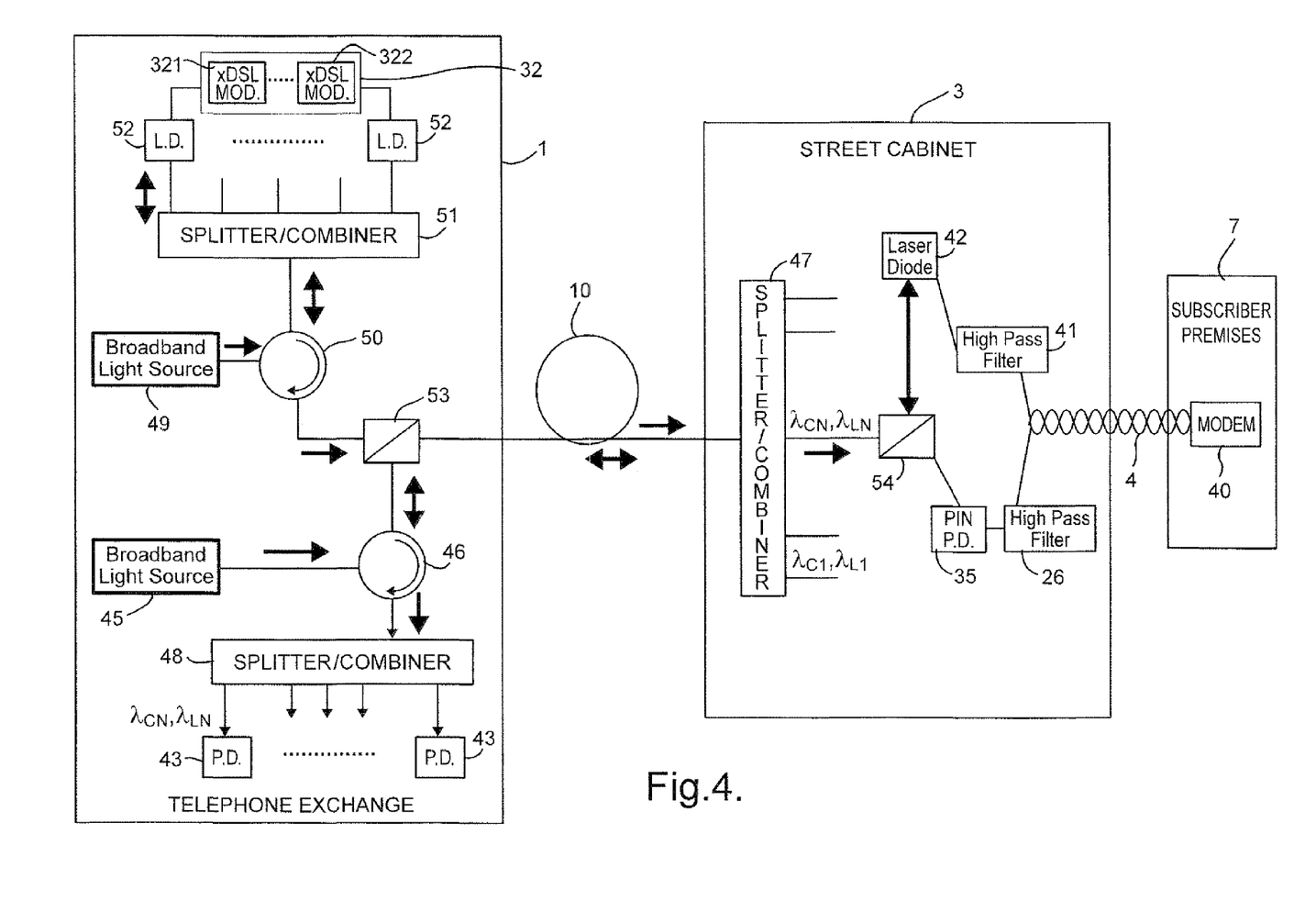
FIG. 4 shows a yet further embodiment of the invention.

In a yet further modification, in order to reduce the amount of fibre required, some of the above features could be combined with a WDM PON as shown in FIG. 4. The subscriber has an XDSL modem 40 which is connected to an individual twisted copper pair 4. In the cabinet 3, the upstream electrical signals from the line 4 are fed via a high-pass filter 41 to modulate the optical signal produced by a laser diode 42. The laser diode 42 consists of a Fabry-Perot laser diode which in a free running state would generate light at a series of wavelengths whose wavelength spacing is regular and determined by the properties of the laser diode. The laser diode is arranged so as to predominantly generate light at one wavelength determined by the wavelength of an optical seed signal which is fed to it, in this example from the exchange 1 (see Refs. 1 and 2). For example, FIG. 4 shows light over a broad range of wavelengths being generated by a broadband light source (e.g., erbium doped fibre amplifier) 45 in the exchange 1 and fed via an optical circulator 46 to an optical fibre 10. In the cabinet 3, the optical fibre is connected to a wavelength dependant dependent splitter/combiner 47 such as a thin film filter or arrayed waveguide grating which selects a particular wavelength $\lambda_{LN}$ and passes it to the laser diode 42. The laser diode then generates light at wavelength $\lambda_{LN}$ modulated with the upstream data and transmits it via the wavelength dependent splitter/combiner and the optical fibre 10 to the exchange. In the exchange, the optical signal passes via the optical circulator 46 to a second wavelength dependent splitter/combiner 48. The wavelength dependent splitter/combiner 48 is connected to a plurality of photodiodes 43 which each receive light at a particular wavelength (each wavelength carrying upstream data from a particular customer which is thus supplied to an XDSL modem in the exchange).

In the downstream direction, a second broadband light source 49 generates light over a different band of wavelengths to the first light source 45. For example, if the first and second broadband light sources 45 and 49 were erbium doped fibre amplifiers, then one could supply wavelengths in the so called "C-band" and the other in the so called "L-band" [ITU standard]. The broadband light source 49 is connected via an optical circulator 50 and a further wavelength dependent splitter/combiner 51 to a set of laser diodes 52, which again consist of Fabry Perot laser diodes. In this way, each of the laser diodes 52 generates light at a different wavelength depending upon which port on the wavelength dependent splitter/combiner it is connected to. Each of the laser diodes 52 is modulated with the downstream output from one 321, 322 of a set of XDSL modulators in the exchange 32. The modulated downstream optical signals from the laser diodes 52 pass from the exchange along the optical fibre to the cabinet 3. Simple 1×2 WDM optical wavelength band splitter/combiner filters 53 and 54 allow the optical signals produced by each of the two broadband light sources to share the same single optical fibre. The transmission of the wavelength dependent splitter/combiner 47 as a function of wavelength is periodic such that the upstream and downstream data for a particular customer propagate along the same optical fibre. On arriving at the cabinet 3, the modulated downstream optical signals are passed by the wavelength dependent splitter/combiner 47 to a device, such as a zero-bias PIN photodiode 35, which converts the signal to an electrical form and applies it via a suitable high pass filter 26 to the appropriate twisted copper pair 4 for the customer. Optionally, the laser diodes 42 and photodiodes 35 located in the cabinet could be fed with a low level of dc power from the subscriber premises or exchange over the or a copper pair. It is not necessary for the interface between the fibres 10 and copper cabling to occur in the cabinet 3 as this could equally occur at the distribution point 5 or indeed other intermediate location between the exchange and the subscriber's premises. Furthermore, the broadband light sources (e.g., 49) and laser diodes (e.g., 52) in the exchange could alternatively be replaced by a set of wavelength specified DFB lasers.

In a yet further modification, the photodiode 35 and laser 42 in FIG. 3 could be replaced by an electroabsorption modulator serving both to detect the downstream optical signal, and modulate the signal for the upstream path. It employs a two way fibre link from the cabinet to the exchange and utilizes an electroabsorption modulator to both detect the optical signal on the down path, and modulate the signal for the return path. xDSL modulation would be applied to the laser within the exchange which would terminate optically on the modulator either in the cabinet or at the DP. The return xDSL signal from the subscriber end would be applied to the modulator which in turn would modulate the optical signal reflected back to the exchange. Given that the upstream and downstream signals are separated in frequency, demodulation becomes a matter of appropriate passive filtering. It is envisaged that the modulator would operate in reflection mode thus requiring only one fibre. Separate contacts could be used to define detector and modulator sections which could be combined with dual wavelength operation.

Figure 5:
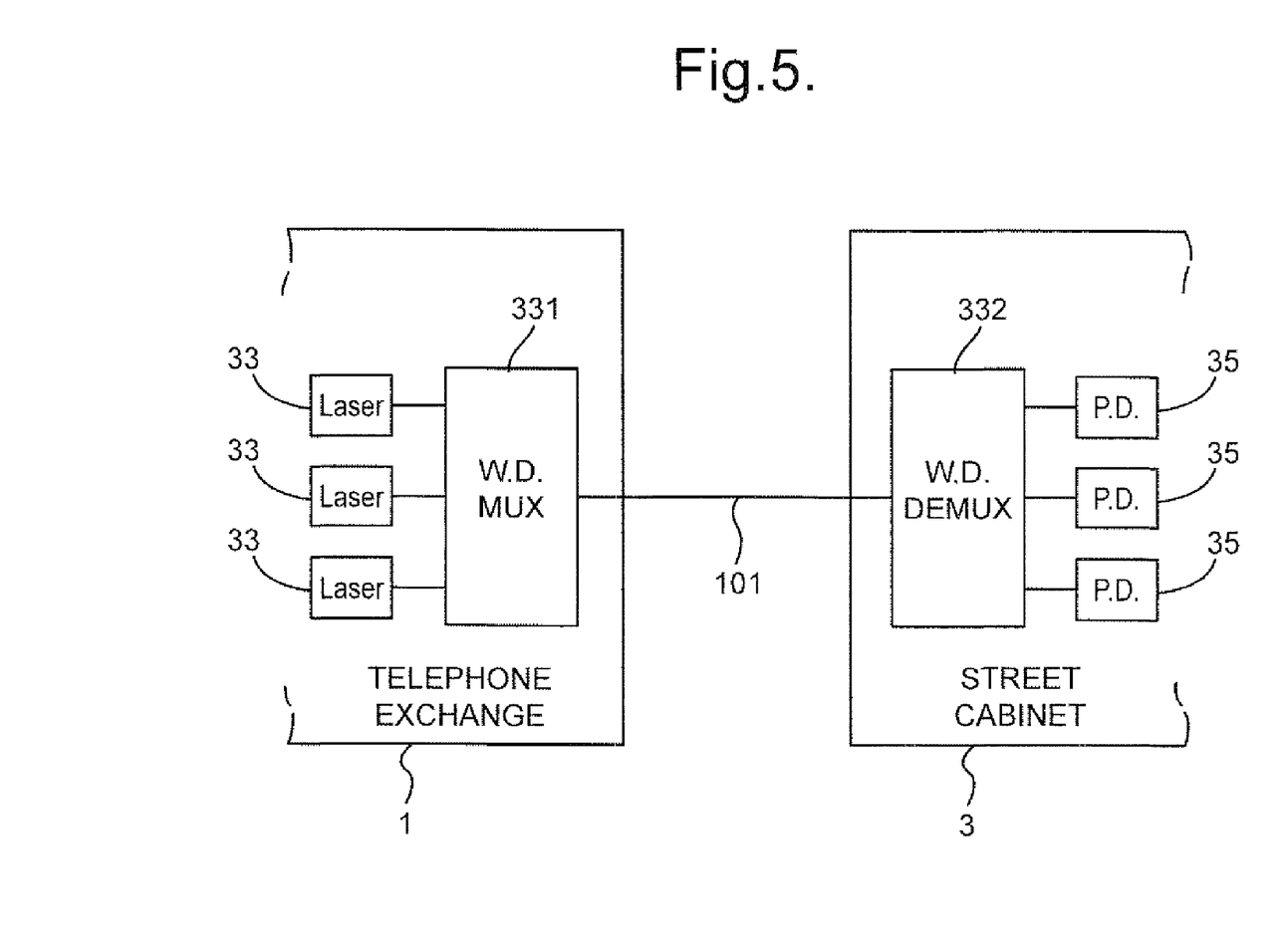
FIG. 5 shows some features of a possible modification to the embodiment of FIG. 2.

A modification of part of the system of FIG. 2 is shown in FIG. 5 (like components are given like numerals). Here, the lasers 33 are configured to transmit at different respective carrier frequencies. A wavelength division multiplexer 331, at the exchange, is arranged to receive the signals from the respective lasers, and to transmit the signals as a wavelength division multiplexed signal over a common link, for example, a common fibre 101. A corresponding wavelength division demultiplexer 332 at the cabinet 3 receives the wavelength division multiplexed signal from the common fibre 101 and demultiplexes the signal. The demultiplexed optical signals are then passed to respective photodiodes 35, which photodiodes provide respective electrical signals to xDSL demodulators 36, in a similar fashion to that shown in FIG. 2. In this way, multiplexing the signals between the exchange 1 and the interface 3 reduces the number of optical fibres required between the exchange and the interface.

With embodiments of this invention, the data for each customer or each termination unit can be transmitted in DSL format, from the exchange—over an optical fibre for at least part of the journey and over a copper pair for the remainder of the journey. One advantage of this is that the equipment at the cabinet/kerb could be passive and require no electrical powering or at least much reduced optical powering of a level which could be safely delivered over telecommunications copper pairs.

Electroabsorption modulators are described in our international patent application WO98/04057.

The following references are incorporated herein by reference:

1. A low cost WDM source with an ASE injected Fabry-Perot semiconductor laser", IEEE photonics technology letters, volume 12, number 8, August 2000, pages 1067-1069

2. Hybrid WDM/TDM pon for 128 subscribers using wavelength—selection—free transmitters". OFC 2004 conference, post deadline paper PDP4.

What is claimed is:

1. A communications network comprising:
 a communications station;
 electrical transmission lines connecting the communications station to user terminations;
 data transmission means;
 optical carriers connecting the data transmission means to at least one interface, located between the communications station and user terminations, for converting optical signals from an optical carrier into electrical signals for transmission over one at least of the electrical transmission lines;

wherein, in respect of at least downstream transport, and for each of a plurality of user terminations requiring data service:
 (a) a dedicated one of said optical carriers is provided;
 (b) the data transmission means comprises modulation means for converting input data signals into output signals suitable for transmission over the electrical transmission lines, followed by means for modulating the output signals onto an optical signal;
 (c) the interface has optoelectrical conversion means arranged to recover said output signals and feed them to the electrical transmission line serving the relevant user termination; and wherein, at least in respect of upstream transmission:
 (d) the communication station has associated therewith a light source for generating a plurality of optical seed signals at different respective wavelengths; and
 (e) there is provided, for each of the user terminations, a light generating device capable of predominantly generating light at a selected one of a plurality of predetermined wavelengths, the light generating devices each being arranged to receive a respective seed signal such that the wavelength of the light generated by a given light generating device is determined by the received seed signal wherein
 the light generating devices are each connected to a respective electrical transmission line serving the relevant user terminal such that data from a given user terminal can be transmitted upstream by the light emitting device connected to that user terminal, and
 the light generating devices are fed with DC power over the electrical transmission lines.

2. A network according to claim 1 including data reception means, connected at the communications station to the electrical transmission lines for receiving data from the user terminations.

3. A network according to claim 1 including data reception means, connected to the optical carriers for receiving data from the user terminations, wherein the interface includes electrooptical conversion means arranged to receive signals from the electrical transmission lines and feed them to the optical carrier sewing the relevant user termination.

4. A network according to claim 1 in which the optoelectrical conversion means and the electrooptical conversion means are together provided by an electroabsorption modulator.

5. A network according to claim 1 in which the optoelectrical conversion means is a zero-bias photodiode.

6. A network according to claim 1 in which the optoelectrical conversion means is a semiconductor device, and including means to draw power from the electrical transmission lines for providing power to the semiconductor device.

7. A network according to claim 6 in which the optoelectrical conversion means is a photodiode, and the means to draw power from the electrical transmission lines are arranged to provide photodiode bias.

8. A network according to claim 7 in which at least one of the electrooptical and the optoelectrical conversion means is a semiconductor device.

9. A network according to claim 7 in which the electrooptical conversion means is a Fabry Perot laser diode, and wherein the output wavelength of the electrooptical conversion means is determined by a seed wavelength fed from the communications station.

10. A network as claimed in claim 8, wherein means are provided to draw power from the electrical transmission lines so as to provide a bias to the or each semiconductor device.

11. A network as claimed in claim 1, wherein the optical carriers are each formed by a respective wavelength channel.

12. A network as claimed in claim 11, wherein at least some of the wavelength channels are carried over a common optical medium, preferably over a common optical fibre.

13. A network as claimed in claim 1, wherein the optical carriers are each formed by a respective optical transmission line.

14. A network as claimed in claim 1, wherein the communications station is a telephone exchange.

* * * * *